United States Patent [19]
Campbell

[11] Patent Number: 5,349,927
[45] Date of Patent: Sep. 27, 1994

[54] ANIMAL PROTECTIVE COLLAR

[76] Inventor: Blair H. Campbell, R.R. #3, Box 7029, Rutland, Vt. 05701

[21] Appl. No.: 172,611

[22] Filed: Dec. 22, 1993

[51] Int. Cl.$^5$ .............................................. A01K 27/00
[52] U.S. Cl. ...................................... 119/815; 119/850
[58] Field of Search ................ 119/815, 850, 855, 814

[56] References Cited

U.S. PATENT DOCUMENTS

| | | | |
|---|---|---|---|
| 829,837 | 8/1906 | Brisacher . | |
| 3,013,530 | 12/1961 | Zeman | 119/106 |
| 3,036,554 | 5/1962 | Johnson | 119/96 |
| 3,251,103 | 5/1966 | Saut | 24/73 |
| 4,200,057 | 4/1980 | Agar | 119/1 |
| 5,012,764 | 5/1991 | Fick et al. | 119/106 |
| 5,138,529 | 8/1992 | Coltan et al. | 361/424 |
| 5,197,414 | 3/1993 | Kanakura | 119/815 |

FOREIGN PATENT DOCUMENTS 4100851 7/1991 Fed. Rep. of Germany ...... 119/815

OTHER PUBLICATIONS

J. A. Webster 1993-94 Catalog pp. 148-149.

Primary Examiner—John G. Weiss
Attorney, Agent, or Firm—Michael J. Weins

[57] ABSTRACT

A protective collar is formed from a sheet of substantially flat resilient material. The sheet is a substantially semicircular section being bounded by an outer semicircular boundary, an inner substantially semicircular boundary, a first substantially straight end and a second substantially straight end. The substantially flat sheet is bent about an axis to form a frusto conical surface. The sheet has clip holes and clip retention holes which, when aligned after bending about the axis, form the frusto conical surface. Resilient clips having a back member and legs attached thereto are provided. The legs have grooves which engage the clip holes and the clip retention holes. In a preferred embodiment, the protective collar is provided with protrusions extending from the inner substantially semicircular boundary toward the axis. The protrusions have a first protrusion hole and a second protrusion hole though which a cord or gauze can be passed to further secure the protective collar when in use.

9 Claims, 6 Drawing Sheets

ANIMAL PROTECTIVE COLLAR

FIELD OF THE INVENTION

The present invention relates to an animal protective collar and more particularly to a collar which will protect against self-inflicted injury by chewing, scratching, or biting by the animals themselves.

BACKGROUND OF THE INVENTION

There have been numerous patents addressing the problem of animals inflicting self injury by biting, scratching, or chewing themselves. U.S. Pat. No. 3,013,530 teaches a protective collar which is a dish like structure having a central hole through which the animal's head passes. The protective collar is supported by a conventional animal collar which attaches to the dish like structure with laces. Such a protective collar must be placed over the head of the animal making it difficult to place it in position on an active animal. U.S. Pat. Nos. 3,036,554 and 4,200,057 employ a split protective collar and thus, will simplify the process of placing the protective collar around the neck of the animal. The protective collar of the '554 patent employs round holes which are aligned and fastened together. The '554 patent illustrates a folding metallic strip and suggests a lace as fasting means. The '057 patent suggests stapling and riveting as fastening means. These means will either make it difficult to attach a protective collar around an animal's neck and/or be difficult to remove the protective collar from the neck without damaging the protective collar. U.S. Pat. No. 5,012,764 discusses the prior art protective collars and means for holding such collars in place. The '764 patent points out that interlocking tabs, shapes, lacings, and the like have been used and points out such closure mechanisms are cumbersome and time-consuming to use. The '764 patent teaches a protective collar which overcomes some of the problems of the earlier fasteners by providing a hook and pile fastener; however, this substantially reduces the range of sizes that the protective collar can use once the fastening material is applied to the protective collar. Thus, there is a need for a simple fastening means which can be easily attached and removed.

Furthermore, while patents like the '530 patent teach the use of a conventional animal collar in combination with the protective collar, the connection is complex and requires additional elements to lash the two collars together. The problem of connection between a protective collar and a conventional animal collar has been overcome in part by providing holes in the protective collar. This solution does not allow the conventional animal collar to be readily adjusted to provide a snug comfortable fit.

OBJECTS OF THE INVENTION

It is an object of the invention to provide a reusable protective collar.

It is another object of the invention to provide a protective collar which is easy to apply and to remove by an individual but difficult to remove by the animal.

It is yet a further object of the present invention to provide a protective collar with a high degree of adjustability.

Still another object of the invention is to provide a protective collar which can be readily combined with a conventional animal collar to further secure the protective collar while maintaining creature comfort for the animal wearing the protective collar.

These and other objects will become apparent from the following description, claims and drawings.

SUMMARY OF THE INVENTION

The present invention is for a protective collar. The protective collar has two principal elements; a flat collar member which preferably provides protrusions for attaching to a conventional animal collar, and a resilient clip for use with the flat collar member which can be easily inserted and removed by the animal handler but is resistant to removal by the animal.

The protective collar is formed from a substantially flat sheet of resilient material having a thickness t. The protective collar is bound by an outer substantially semicircular boundary, an inner substantially semicircular boundary, a first substantially straight end, and a second substantially straight end. The outer substantially semicircular boundary and the inner substantially semicircular boundary have a common axis which serves as the axis for a frusto conical surface that is formed when the first substantially straight end is overlaid onto said second substantially straight end.

It is preferred that the protective collar be formed from a substantially flat sheet of resilient material having an inner substantially semicircular boundary with protrusions thereon. Each of the protrusions has a pair of holes through which a conventional animal collar such as an identification collar can be passed to further secure the protective collar to the animal while maintaining creature comfort.

A clip hole pattern having at least two clip holes is provided in the flat resilient sheet. The clip holes are rectangular having a first pair of spaced apart sides and a second pair of spaced apart sides. The first pair of spaced apart sides is substantially perpendicular to the inner and outer substantially semicircular boundaries.

There is at least one adjustment hole pattern having at least two clip receiving holes in the flat resilient sheet. Each of the clip receiving holes has a first pair of spaced apart sides substantially perpendicular to the outer substantially semicircular boundary. Each of the adjustment patterns is configured to be coincident with the clip hole pattern which is superimposed thereon to form the frusto conical surface.

Resilient clips are provided which engage the clip holes and clip receiving holes positioned thereunder converting the substantially flat sheet of resilient material to the frusto conical surface. The resilient clip has a back member having an upper surface and a lower surface. A first leg having a first leg inner surface and a first leg outer surface is attached to the lower surface of the back member. A second leg is attached to the lower surface of the back member. The second leg is spaced apart from the first leg and has a second leg inner surface and a second leg outer surface.

A first groove having first groove sidewalls and a first groove bottom resides in the first leg outer surface, while a second groove having second groove sidewalls and a second groove bottom resides in the second leg outer surface. The first groove sidewalls and the second groove sidewalls are separated by a distance W which is greater than 2 t. The first groove bottom and the second groove bottom are so positioned that when the resilient clip is engaged in the clip hole, the groove bottoms compressively engage the second pair of spaced apart sidewalls of the clip holes.

BRIEF DESCRIPTION OF THE FIGURES

FIG. 1 is a top view of a protective collar for one embodiment of the present invention. The protective collar is constructed from a flat sheet of a resilient material which, when bent about a common axis, provides the protective collar with a frusto conical surface. The protective collar is bounded in part by two semicircular ends centered about the common axis. These semicircular ends provide a band of material which is terminated by rectangular extensions. The combination provides a U shaped sheet which, when wrapped about the axis, provides a frusto conical surface. The extensions provide additional overlap between the ends when the protective collar is bent around the axis to form a frusto conical surface.

FIG. 3 illustrates the notch configuration which will provide adequate gripping of the sheet of resilient material while providing sufficient clearance to allow the protective collar to be readily released by applying pressure to legs of the resilient clip. The resilient clips are preferably inserted such that the clip legs extend into the volume swept out by the frusto conical surface generated by the sheet of resilient material.

BEST MODE OF CARRYING THE INVENTION INTO PRACTICE

Figure 1:
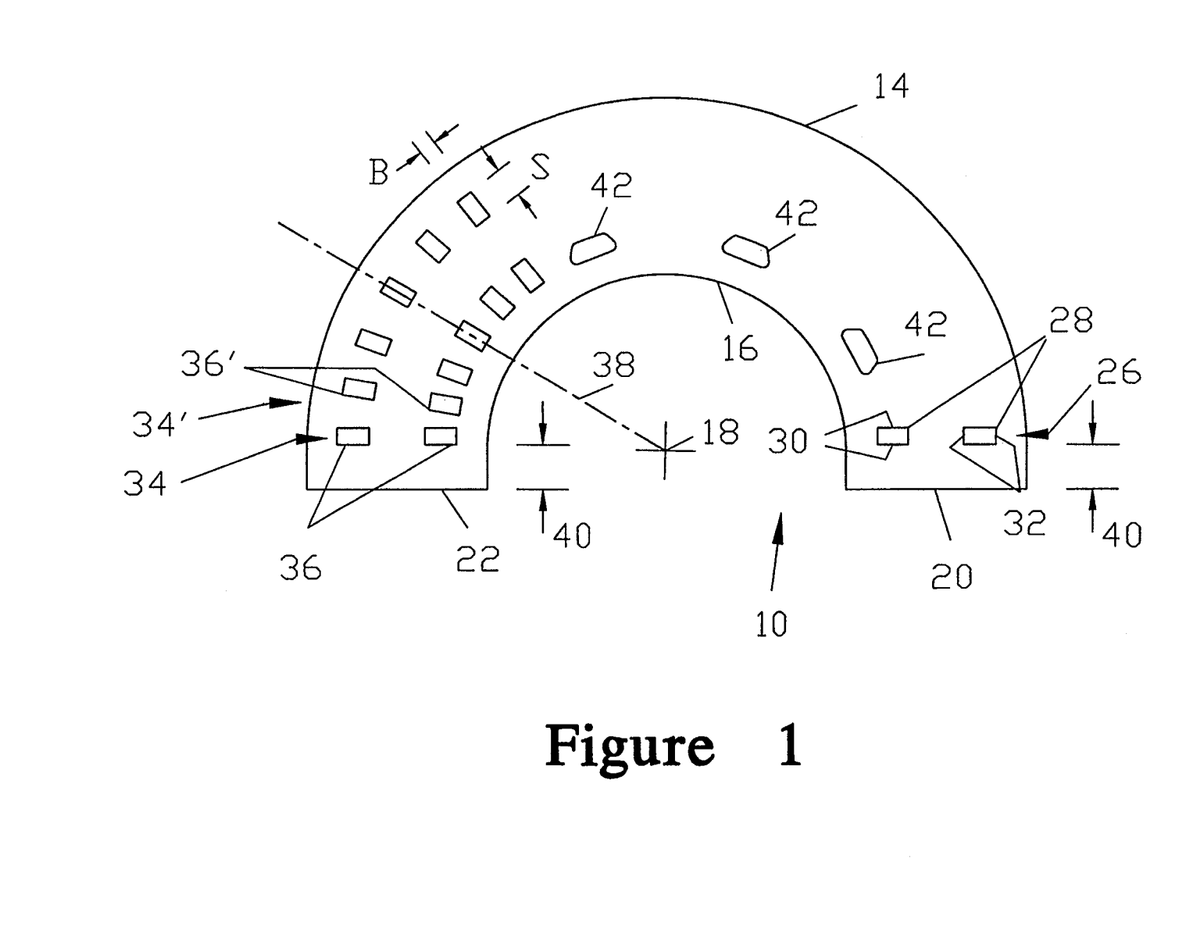

FIG. 1 illustrates a protective collar 10 formed from substantially flat material and bounded by an outer substantially semicircular boundary 14 and an inner substantially semicircular boundary 16. These substantially semicircular boundaries (14, 16) are generated about a common axis 18. The protective collar 10 is further bounded by a first substantially straight end 20 and a second substantially straight end 22.

Figure 2:
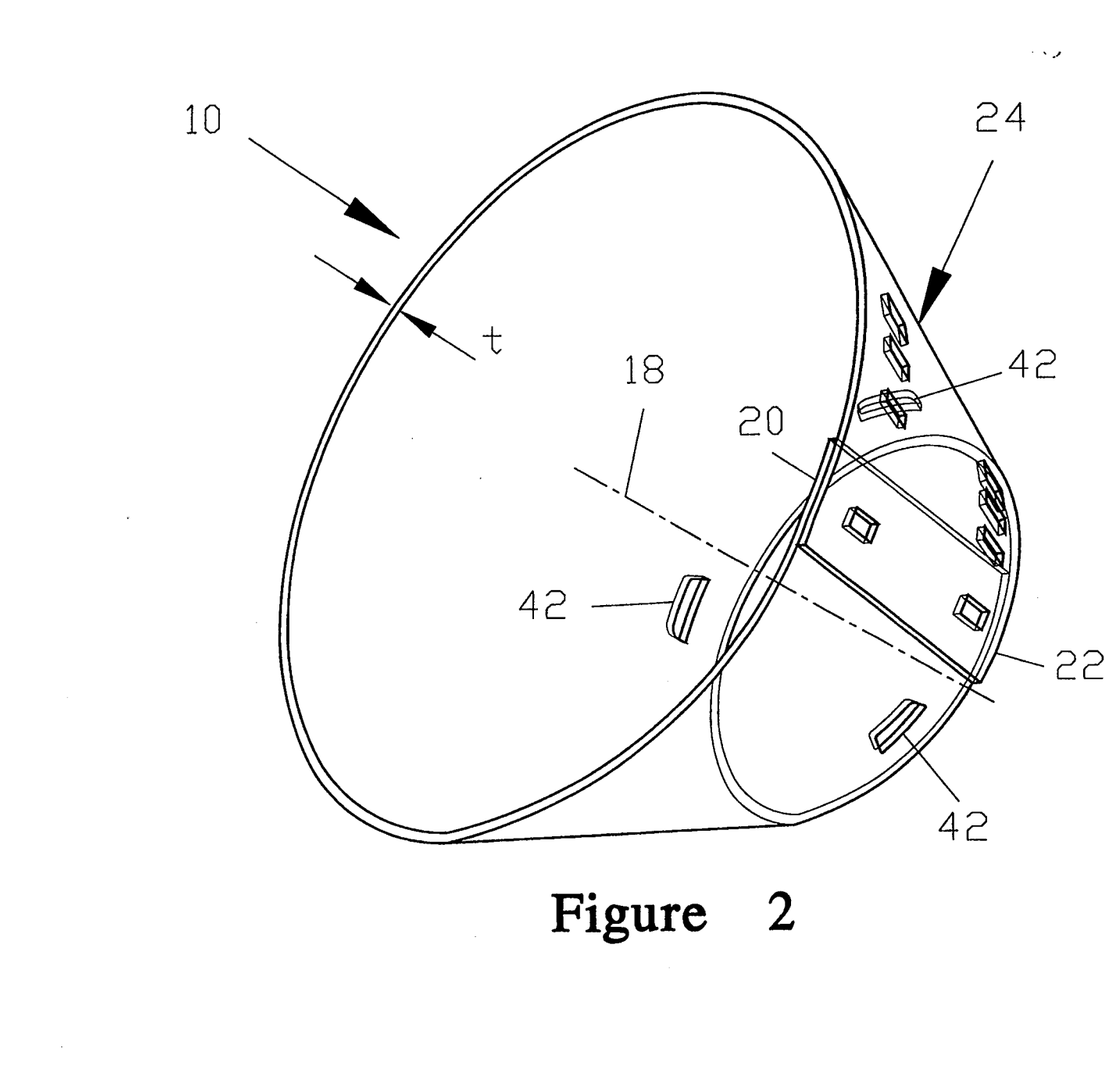
FIG. 2 is an isometric drawing depicting the protective collar constructed from the flat resilient sheet of FIG. 1 after it has been bent about the common axis such that the rectangular extensions overlap, producing a frusto conical surface. The isometric view shows the thickness of the sheet. When plastics such as PVC, PETG, PET, or PP are employed for the material, a thickness of between about 0.01 of an inch and 0.125 of an inch is preferable. The lower limit assures that the thickness is of sufficient strength to avoid ripping of the protective collar and the protective collar has enough resiliency for maintaining the frusto conical surface. The upper limit assures sufficient flexibility to bend the protective collar conveniently to the desired shape and assures that the protective collar will be light enough for creature comfort.

FIG. 2 illustrates the protective collar 10 of FIG. 1 when the first substantially straight end 20 has been overlaid by the second substantially straight end 22 and the protective collar 10 is transformed from the substantially planar sheet to a non-planar sheet, providing a frusto conical surface 24.

The protective collar 10, in its planar form, can be made from a sheet of resilient material such as a plastic which can be readily bent to transform the protective collar 10 from a planar form to the frusto conical surface 24. The sheet of material is preferably a plastic such as PVC, PETG, PET and PP. It is further preferred that the material be clear so as not to interfere with the vision of the animal which is wearing the protective collar 10.

Referring to FIG. 1, the protective collar 10 preferably has a thickness t of between about 0.01 inch and 0.125 inch, t being illustrated in FIG. 2. The lower limit assures sufficient thickness to avoid ripping of the protective collar 10 when it is worn and to provide sufficient rigidity to stabilize the frusto conical surface 24. The upper limit assures that the protective collar 10 will remain pliable enabling the protective collar 10 to be formed into the frusto conical surface 24. The upper limit will also limit the weight of the protective collar 10 and avoid its weight being a burden to the animal wearing the protective collar 10 thereby increasing creature comfort.

In order to affix the first substantially straight end 20 with respect to the second substantially straight end 22, a clip hole pattern 26 is provided in the vicinity of the first substantially straight end 20. The clip hole pattern 26 has at least two clip holes 28. When the difference in the radius of the outer substantially semicircular boundary 14 and the inner substantially semicircular boundary 16 is greater than about fifteen (15) inches, a third clip hole is preferred. Also, for the protective collars of this size or greater, the preferred minimum thickness is about 0.03 of an inch. This thickness will provide sufficient rigidity for the increased size and, because of the increased size, will provide adequate flexibility. The clip holes 28 have a first pair of sides 30 which are substantially perpendicular to the outer substantially semicircular boundary 14 and the inner substantially semicircular boundary 16. A second pair of sides 32 are substantially perpendicular to said first pair of sides 30.

Figure 4:
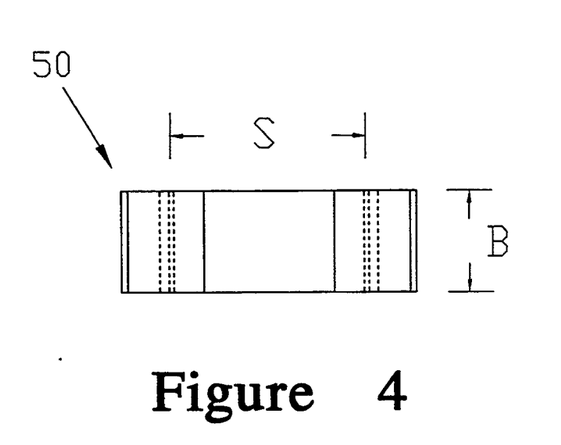
FIG. 4 is a bottom view of the resilient clip of FIG. 3 showing the separation S of the bottoms of the grooves which hold the protective collar.
Figure 5:
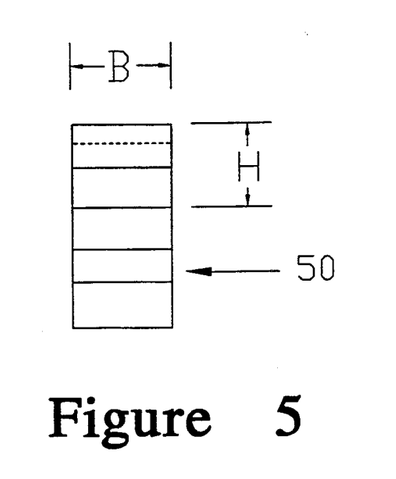
FIG. 5 is an end view of the resilient clip of FIGS. 3 and 4 illustrating the preferred height of the back member of the resilient clip above the slots into which the flexible sheet resides.
Figure 9:
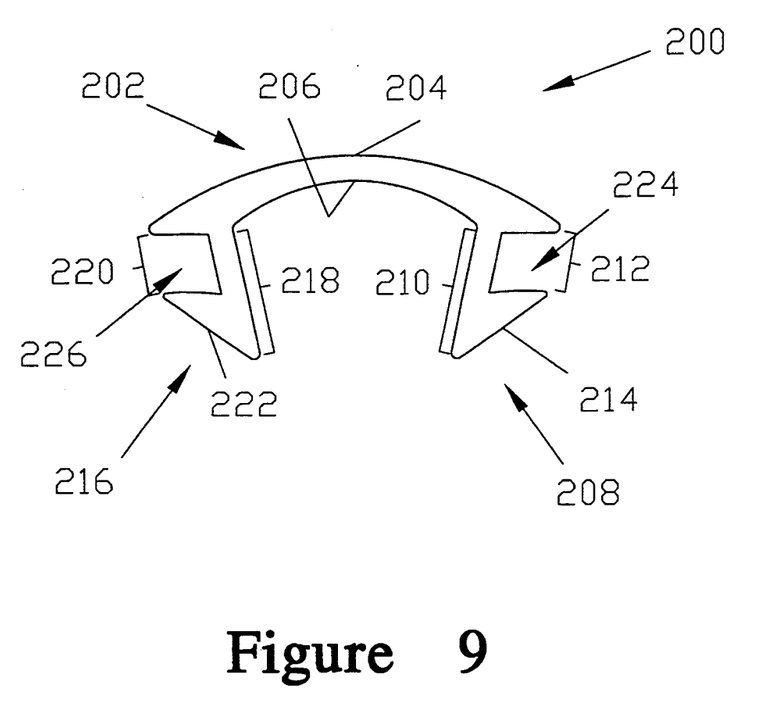
FIG. 9 is a resilient clip which forms an element of a preferred embodiment of the present invention which is suitable for use with the flexible sheet of FIGS. 1 and 6. The resilient clip of this embodiment differs from the embodiment of FIGS. 3 through 5 in that the width W (shown in FIG. 3) of the notches has been extended to substantially span the outer surface of the legs facilitating the insertion and removal of the clip by the animal handler and providing additional resistance to the removal of the protective collar by the animal wearing the protective collar by placing the back element of the resilient clip in closer proximity with respect to the frusto conical surface.

At least one adjustment hole pattern 34 having clip receiving holes 36 is provided. The first adjustment hole pattern 34 provides a first set of clip receiving holes 36 configured such that they can be brought into coincidence with the clip holes 28. When the clip holes 28 and clip receiving holes 36 are aligned, the frusto conical surface 24, illustrated in FIG. 2, results. The registry of the clip holes 28 and the clip receiving holes 36 are maintained with clips. A first embodiment for the resilient clips forms an element of the present invention which is illustrated in FIGS. 3 through 5 while a second embodiment for the resilient clips is illustrated in FIG. 9.

To provide symmetry in the protective collar 10, when the clip holes 28 are aligned with the clip receiving holes 36, it is preferred that the clip holes 28 and the clip receiving holes 36 lie on radial lines 38 radiating from the common axis 18. When the protective collar 10 of FIG. 1 is bent such that the clip holes 28 are in registry with the clip receiving holes 36, the cross section of the frusto conical surface 24 has been maximized. The cross section of the protective collar 10 can be reduced by bringing an alternate adjustment hole pattern 34' into position such that its clip receiving holes 36' align with the clip holes 28. Again, these alternate series of clip receiving holes 36' are arranged on a radial line passing through the common axis 18. To increase the strength of the protective collar 10 and to assure its symmetry at maximum cross section of the frusto conical surface 24, it is preferred that the first substantially straight end 20 and the second substantially straight end 22 are rectangular extensions 40 which extend beyond the clip hole pattern 26 and the adjustment hole pattern 34, converting the C shaped protective collar into a U shaped protective collar.

The protective collar 10, as illustrated in FIGS. 1 and 2, is also provided with collar holes 42 like those provided in the commercial version of the '764 patent through which a conventional animal collar or a cord can be threaded to further hold the frusto conical surface 24 in place about the animal's neck.

Figure 3:
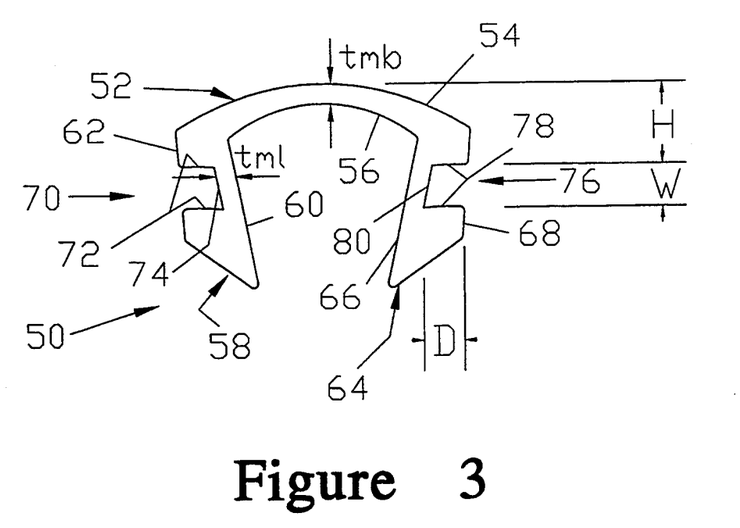
FIG. 3 is a side view of a resilient clip for use with the sheet of resilient material shown in FIGS. 1 and 2.

FIG. 3 shows a side view of a resilient clip 50 which is an element of one embodiment of the present invention. The resilient clip 50 is preferably fabricated from a plastic such as nylon and acetal. The resilient clip 50 has a back member 52 with an upper surface 54 and a lower surface 56. A first leg 58 is attached to the lower surface 56 of the back member 52. The first leg 58 has a first leg inner surface 60 and a first leg outer surface 62. A second leg 64 is spaced apart from the first leg 58 and attaches to the lower surface 56 of the back member 52. The second leg 64 has a second leg inner surface 66 and a second leg outer surface 68.

A first groove 70 resides in the first leg outer surface 62 and has first groove sidewalls 72 and a first groove bottom 74. Similarly, a second groove 76 resides in the second leg outer surface 68 and has second groove sidewalls 78 and a second groove bottom 80. The first groove sidewalls 72 and the second groove sidewalls 78 are separated by a width W which is greater than 2 t, where t is the thickness of the protective collar 10 and is shown in FIG. 2. The maximum distance of separation of the sidewalls W is less than about six to eight times the thickness of the protective collar 10. The first groove bottom 74 and the second groove bottom 80 are separated such that when the resilient clip 50 is engaged in one of the clip holes 28 and one of its corresponding clip receiving holes (36, 36'), the first groove bottom 74 and the second groove bottom 80 will compressively engage the second pair of sides 32 of the clip holes 28.

It is further preferred that depth D of the grooves (70, 76) be about equal to the width W of the grooves (70, 76). These proportions will assure that the resilient clip 50 grips the protective collar 10 but remains shallow enough that it can be readily released by compressing the first leg 58 and the second leg 64 toward each other.

The resilient clip 50, when engaged in the protective collar 10, will extend above the frusto conical surface 24. This height will be approximately height H which is the distance from the top of the grooves (70, 76) to the upper surface 54 of the back member 52. Preferably, this height H is not more than about one-fourth ($\frac{1}{4}$) of an inch. By so limiting the height, the probability of the animal disengaging the resilient clip 50 with its paw is reduced. It is preferred that the upper surface 54 of the back member 52 be concave when viewed from the first leg 58 and the second leg 64. Having the upper surface 54 so configured will reduce the cross section of the resilient clip 50 and will further reduce the likelihood that the animal will be able to remove the protective collar 10 with its paw.

To further impede an animal's ability to release the protective collar 10, it is important that the resilient clip 50 be inserted in the clip holes 28 and the corresponding clip receiving holes (36, 36') so that the resilient clip 50 is compressed radially rather than circumferentially. This limits compression of the resilient clip 50 by stretching the protective collar 10 in a radial direction.

To assure that the resilient clips 50 are properly inserted in the clip holes 28 and the corresponding clip receiving holes (36, 36') (labeled in FIG. 1), it is preferred that the clip holes 28, the clip receiving holes (36, 36'), and the resilient clips 50 have a cross-section which will limit how the resilient clips 50 can engage the clip holes 28 and the clip receiving holes (36, 36'). This can readily be done with rectangular holes. The clip holes 28, the clip receiving holes (36, 36'), and the resilient clips 50 should have a common breadth B, which is illustrated in FIGS. 4 and 5 for the resilient clips 50. This breadth is the breadth B of the rectangular clip holes 28 and clip receiving holes (36, 36') in FIG. 1. The breadth B is preferably the lesser of the dimensions of the rectangular holes. The larger dimension is equal to the separation S between the groove bottoms (74, 80). This ratio will reduce the needed pressure to release the resilient clips 50. It is further preferred that when rectangular holes are used, the corners of the clip holes 28 and the clip receiving holes (36, 36') should be filleted to reduce the likelihood of tearing while the resilient clips 50 are being inserted or removed. As discussed above, it is preferred that the longer side of the clip holes 28 and the clip receiving holes 36 be the dimension perpendicular to the outer substantially semicircular boundary 14 and the inner substantially semicircular boundary 16.

It is further preferred that the lower surface 56 of the resilient clip 50 be concave in the region between the first leg 58 and the second leg 64. This concave surface will promote the bending of the back member 52 when the legs (58, 64) are moved toward each other thereby facilitating the insertion of the resilient clip 50. To promote bending in the back member 52 in preference of the legs (58, 64), the minimum thickness of the back member tmb to the minimum thickness of the legs tml should be adjusted such that the principal deformation will occur in the back member 52. Preferential bending of the back member 52 will make removal of the resilient clips easier.

Figure 6:
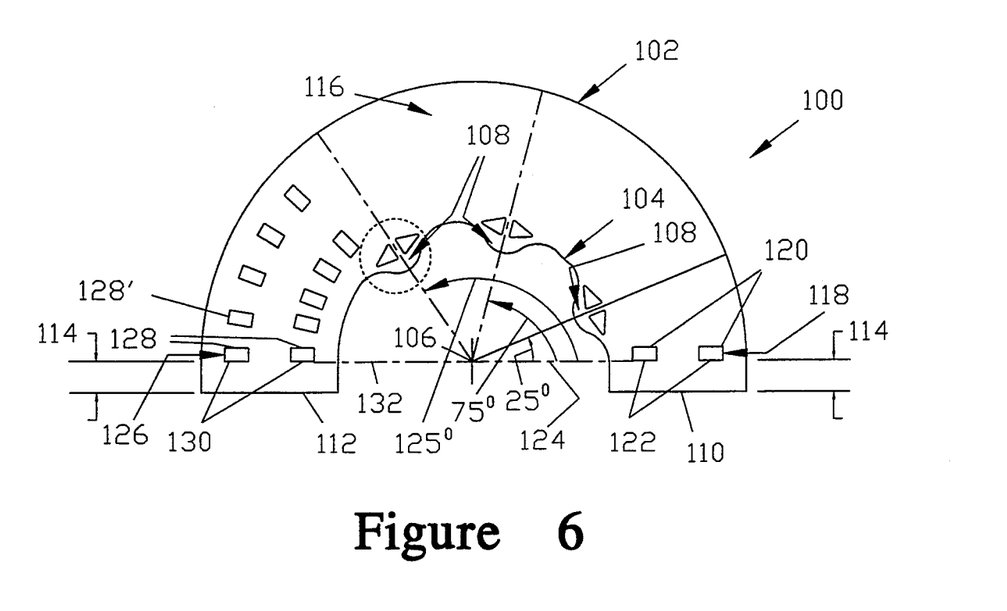
FIG. 6 is a top view of one element of a preferred embodiment of the protective collar of the present invention having protrusions on an inner semicircular boundary. The element is a sheet of resilient material having a shape similar to the shape of FIG. 1 with the exception of the protrusions which extend inward toward the common axis. Each of the protrusions has a pair of collar holes through which a cord, a strip of gauze, or a conventional animal collar can be passed and adjusted to snugly fit the neck of the animal, further securing the frusto conical surface.

FIG. 6 illustrates another embodiment of the present invention for a protective collar 100 formed from a material of the type discussed with respect to the embodiment of FIGS. 1 and 2. The protective collar 100 is bounded on one side by an outer substantially semicircular boundary 102. On an opposite side, the protective collar 100 is bounded by an inner substantially semicircular boundary 104. These substantially semicircular boundaries (102, 104) are generated about a common axis 106. The inner substantially semicircular boundary 104 has superimposed protrusions 108 extending therefrom. The protrusions 108 extend inward from the inner substantially semicircular boundary 104 toward the common axis 106. The protective collar 100 is further bounded by a first substantially straight end 110 and a second substantially straight end 112 and these substantially straight ends (110, 112) have rectangular extensions 114 which attach to and continue a substantially semicircular central section 116 of the protective collar 100.

A clip hole pattern 118 having clip holes 120 is positioned such that leading edges 122 of the clip holes 120 lie along a radial line 124 initiating at the common axis 106. The leading edges 122 of the clip holes 120 divide the substantially semicircular central section 116 from the rectangular extensions 114 of the first substantially straight end 110. At least one adjustment hole pattern 126 having clip receiving holes 128 is provided and positioned having leading edges 130 which lie on a radial line 132 which in turn separates the rectangular extension 114 of the second substantially straight end 112 and the substantial semicircular central section 116.

It is preferred that at least three protrusions 108 be employed and that they lie in the angular region between the leading edges 122 of the clip holes 120 and the region of the protective collar 100 where the clip receiving holes (128, 128') lie. When the greatest separation between the clip receiving holes 128 and the clip holes 120 is about 180°, the protrusions 108, positioned with respect to the leading edges 122 of the clip holes 120, should preferably be maintained at 25°, 75°, and 125°. These angles provide a well spaced set of protrusions 108. For such a separation, all clip receiving holes (128, 128') should be at an angular separation from the clip holes 120 of greater than 125°.

Figure 7:
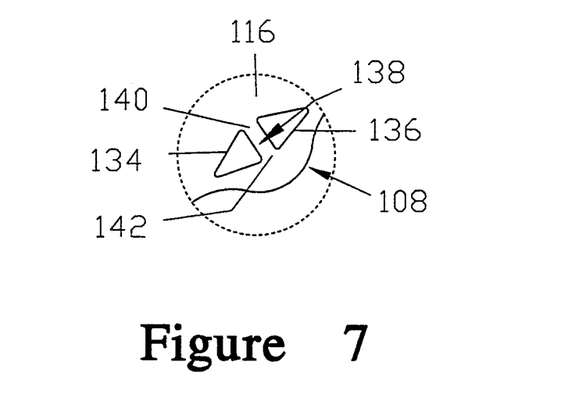
FIG. 7 is an enlargement of the section circled in FIG. 6.

Referring to FIG. 7 which is an enlargement of the region of the protective collar 100 in the vicinity of one of the protrusions 108, the protrusions 108 are preferably provided with a first collar hole 134 spaced apart from a second collar hole 136. The region between the collar holes (134, 136) forms straps 138. The collar holes (134, 136) preferably span the semicircular central section 116 and the protrusion 108 and are centered with respect to the inner substantially semicircular boundary 104. The straps 138 have a strap first end 140 terminating in the semicircular central section 116 and a strap second end 142 terminating in the protrusion 108. As a result of the positioning of the first collar hole 134 and the second collar hole 136, the the strap first end terminates in the substantially semicircular central section 116 and the strap second end 142 terminates in the protrusion 108. Having the straps 138 traverse the semicircular central section 116 and the protrusions 108 results in any pressure resulting from contact with the neck by the protective collar 100 being distributed between the semicircular central section 116 and the protrusions 108.

The protective collar 100 is stabilized by the semicircular central section 116 while still allowing the protrusions 108 to substantially conform to the neck of the animal wearing the protective collar 100 providing a tight but comfortable protective collar 100.

Figure 8:
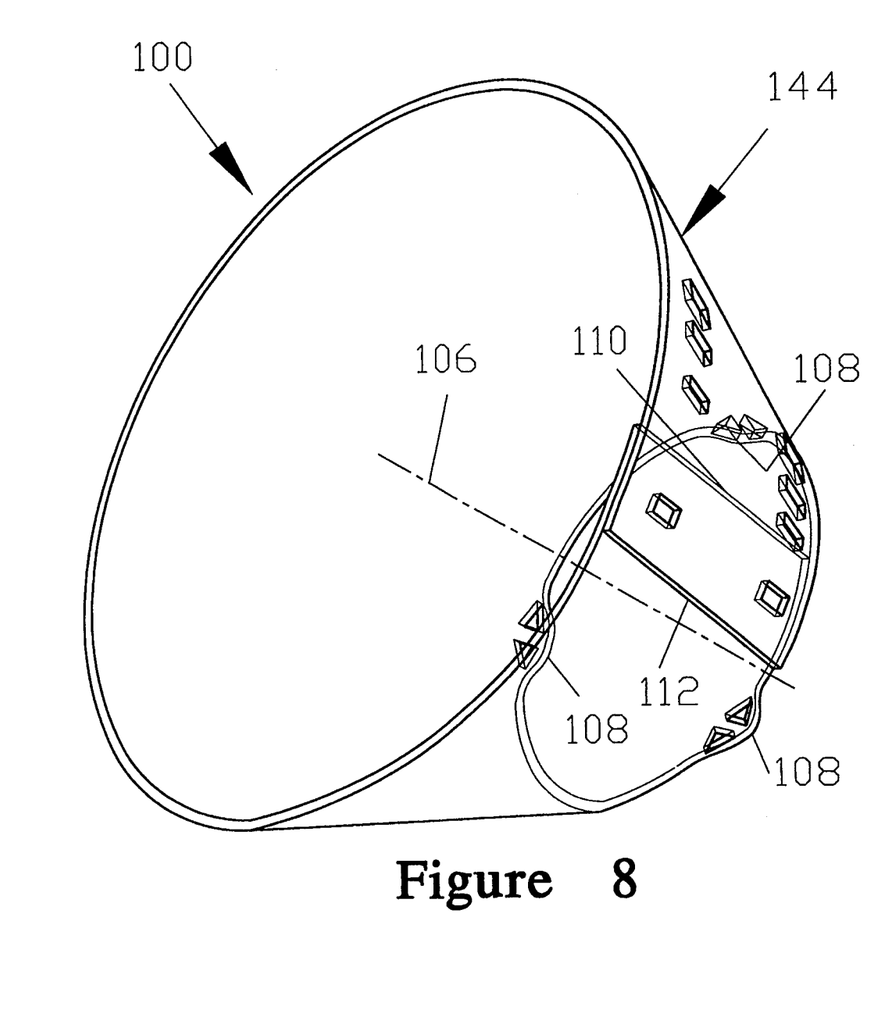
FIG. 8 is an isometric view of the protective collar of FIG. 6 illustrating the position of the protrusions when the protective collar is bent around the common axis generating a frusto conical surface.

FIG. 8 is the protective collar 100 of FIG. 6 where the protective collar 100 has been symmetrically disposed about the common axis 106 by bending the protective collar 100 such that the first substantially straight end 110 is superimposed by the second substantially straight end 112. When the protective collar 100 is so positioned, the protrusions 108 provide localized contact with the neck of the animal wearing the protective collar 100. With the configuration of the protrusions 108 positioned as illustrated in FIGS. 6 and 8, the protrusions 108 will provide a well distributed contact area on the animal's neck. While the protective collar 100 of FIG. 8 is illustrated with the use of the clips that form another aspect of the present invention, it should be appreciated that the benefits of the collar design of FIGS. 6 and 8 are not dependent on fastener means used to maintain the protective collar 100 in a frusto conical surface 144.

FIG. 9 is a preferred resilient clip 200 which has a back member 202 having an upper surface 204 and a lower surface 206. A first leg 208 is attached to the lower surface 206 of the back member 202. The first leg 208 has a first leg inner surface 210 and a first leg outer surface 212 where the first leg inner surface 210 extends beyond the first leg outer surface 212. The first leg 208 has a first leg terminating surface 214 which extends between the first leg inner surface 210 and the first leg outer surface 212. Preferably, the first leg terminating surface 214 is planar.

A second leg 216 is attached to the lower surface 206 of the back member 202. The second leg 216 has a second leg inner surface 218 and a second leg outer surface 220 where the second leg inner surface 218 extends beyond the second leg outer surface 220. The second leg 216 has a second leg terminating surface 222 which extends between the second leg inner surface 218 and the second leg outer surface 220. Preferably the second leg terminating surface 222 is planar.

In the preferred embodiment of the resilient clip 200 of FIG. 9, a first leg groove 224 is provided which substantially spans the length of the first leg outer surface 212 and is in close proximity to the first leg terminating surface 214. Similarly a second leg groove 226 is provided which substantially spans the length of the second leg outer surface 220 and is in close proximity to the second leg terminating surface 222. Having the grooves (224, 226) so positioned with respect to the leg terminating surfaces (214, 222) facilitates the snapping of the resilient clip 200 into and out of the clip holes.

The first leg groove 224 and the second leg groove 226 are also in close proximity to the upper surface 204 of the back member 202 which assures that the clips cannot be readily loosened by the animal wearing the protective collar such as the protective collars of FIGS. 1, 2, 6, and 8.

What I claim is:

1. A protective collar comprising:
   a collar formed from a substantially flat sheet of resilient material having a thickness t, said sheet of resilient material being bounded by an outer substantially semicircular boundary, an inner substantially semicircular boundary, a first substantially straight end, and a second substantially straight end, said outer substantially semicircular boundary and said inner substantially semicircular boundary having a common axis, said axis serving as an axis for a frusto conical surface formed when said first substantially straight end is overlaid onto said second substantially straight end;

a clip hole pattern having at least two clip holes, said at least two clip holes being rectangular having a first pair of spaced apart sides and a second pair of spaced apart sides with said first pair of spaced apart sides being substantially normal to said outer substantially semicircular boundary and said inner substantially semicircular boundary;

at least one adjustment hole pattern having at least two clip receiving holes each of said clip receiving holes having a first pair of spaced apart sides which are substantially normal to said outer substantially semicircular boundary and said inner substantially semicircular boundary, each of said at least one series of adjustable hole patterns being coincident with said clip hole pattern when superimposed thereon; and resilient clips engaging said clip holes and one of said series of adjustable holes positioned therebelow, said clips having, a back member having an upper surface and a lower surface, a first leg attaching to said lower surface of said back member, said first leg having a first leg inner surface and a first leg outer surface, a second leg attaching to said lower surface of said back element, said second leg having a second leg inner surface and a second leg outer surface, said second leg being spaced apart from said first leg, and a first groove having first groove sidewalls and a first grove bottom, said first groove residing in said first leg outer surface and a second groove having second groove sidewalls and a second groove bottom, said second groove residing in said second leg outer surface, said first groove sidewalls and said second groove sidewalls being separated by a distance W which is greater than 2 t and said first groove bottom and said second groove bottom being positioned such that when said resilient clip is engaged in one of said clip holes said first groove bottom and said second groove bottom will compressibly engage said second pair of spaced apart sidewalls of said clip holes.

2. The protective collar of claim 1 wherein said upper surface of said back member of said resilient clip forms a concave surface with respect to said first leg and said second leg and terminates in close proximity with respect to said first groove and said second groove.

3. The protective collar of claim 2 wherein said lower surface is concave with respect to said first leg and said second leg in the region therebetween.

4. The protective collar of claim 3 where in said resilient clip has a variable cross-section with said variable cross section having minimum cross section in said back member.

5. The protective collar of claim 4 wherein said first leg inner surface extends beyond said first leg outer surface and a first leg terminating surface extends therebetween, and said second leg inner surface extends beyond said second leg outer surface and a second leg interface surface extends therebetween.

6. The protective collar of claim 5 wherein said first terminating surface and said second terminating surface are essentially planar and said essentially planar surfaces intersect said first leg outer surface and said second leg outer surface in close proximity to said first groove and said second groove.

7. The device of claim 6 wherein said first groove and said second groove have a depth D;

$0.01 < t < 0.125$;

$W > 2t$; and

D is approximately equal to W.

8. The protective collar of claim 1 wherein said inner substantially semicircular boundary has protrusions directed inward to said common axis each of said protrusions having a pair of holes therein.

9. The protective collar of claim 1 wherein said substantially circular ends form semicircles and rectangular extensions attach thereto to generate a U shaped substantially flat collar.

* * * * *